United States Patent
Takata et al.

(10) Patent No.: US 9,570,061 B2
(45) Date of Patent: Feb. 14, 2017

(54) ACOUSTIC MATERIAL AND WIRE HARNESS WITH ACOUSTIC MATERIAL

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Yutaka Takata, Mie (JP); Shigeyuki Tanaka, Mie (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

(21) Appl. No.: 14/913,439

(22) PCT Filed: Aug. 1, 2014

(86) PCT No.: PCT/JP2014/070319
§ 371 (c)(1),
(2) Date: Feb. 22, 2016

(87) PCT Pub. No.: WO2015/025696
PCT Pub. Date: Feb. 26, 2015

(65) Prior Publication Data
US 2016/0210954 A1    Jul. 21, 2016

(30) Foreign Application Priority Data
Aug. 22, 2013    (JP) ................................ 2013-172328

(51) Int. Cl.
*B60R 16/02*    (2006.01)
*B32B 5/02*    (2006.01)
(Continued)

(52) U.S. Cl.
CPC ............. *G10K 11/168* (2013.01); *B32B 5/022* (2013.01); *B32B 5/26* (2013.01); *B32B 7/02* (2013.01);
(Continued)

(58) Field of Classification Search
CPC ........ B60R 16/0207; B32B 5/022; B32B 5/24; B32B 5/26
(Continued)

(56) References Cited

U.S. PATENT DOCUMENTS 6,000,959 A * 12/1999 Curtindale .......... B60R 16/0207
439/246
7,913,807 B2 * 3/2011 Gomi .................. B60R 11/0217
181/149

(Continued)

FOREIGN PATENT DOCUMENTS

| JP | 10-203268 | 8/1998 |
|---|---|---|
| JP | 2003-49351 | 2/2003 |

(Continued)

OTHER PUBLICATIONS

International Search Report.

*Primary Examiner* — Jeremy Luks
(74) *Attorney, Agent, or Firm* — Gerald E. Hespos; Michael J. Porco; Matthew T. Hespos

(57) ABSTRACT

It is aimed to provide a sound-absorbing material and a wiring harness with sound-absorbing material capable of absorbing sound in a wide frequency range from a low frequency to a high frequency and avoiding a weight increase. A sound-absorbing material 1 is configured by laminating base material sheets 3 using non-woven fabrics and a skin material sheet 2 having a smaller basis weight than the base material sheets 3 such that the skin material sheet 2 is arranged between the plurality of base material (Continued)

sheets 3 and an air permeation amount of the sound-absorbing material is within a range of 5 to 50 cm$^3$/cm$^2$·s.

6 Claims, 8 Drawing Sheets

(51) Int. Cl.
    *G10K 11/168*      (2006.01)
    *B32B 5/26*      (2006.01)
    *B32B 7/02*      (2006.01)
    *B60R 13/08*      (2006.01)

(52) U.S. Cl.
CPC ........ *B60R 16/0207* (2013.01); *B32B 2250/20* (2013.01); *B32B 2262/0253* (2013.01); *B32B 2262/0276* (2013.01); *B32B 2307/102* (2013.01); *B32B 2307/718* (2013.01); *B32B 2307/724* (2013.01); *B32B 2457/00* (2013.01); *B32B 2605/00* (2013.01); *B32B 2605/08* (2013.01); *B60R 13/08* (2013.01)

(58) Field of Classification Search
USPC .................................................. 181/290, 291
See application file for complete search history.

(56) References Cited

U.S. PATENT DOCUMENTS

| 8,695,757 | B2* | 4/2014 | Duval | B32B 5/22 |
| | | | | 181/286 |
| 2004/0216949 | A1* | 11/2004 | Tompson | B29C 44/0461 |
| | | | | 181/204 |
| 2005/0126848 | A1* | 6/2005 | Siavoshai | B60R 13/0815 |
| | | | | 181/207 |
| 2006/0021823 | A1* | 2/2006 | Kohara | B32B 5/24 |
| | | | | 181/290 |
| 2014/0027200 | A1 | 1/2014 | Mori et al. | |
| 2015/0203058 | A1* | 7/2015 | Osada | B60R 13/0243 |
| | | | | 307/9.1 |
| 2015/0232044 | A1* | 8/2015 | Demo | B60R 13/08 |
| | | | | 181/290 |
| 2015/0283962 | A1* | 10/2015 | Kobayashi | B60R 16/0207 |
| | | | | 174/72 A |
| 2015/0380916 | A1* | 12/2015 | Shimada | B60R 16/0207 |
| | | | | 174/72 A |

FOREIGN PATENT DOCUMENTS

| JP | 2006-256566 | 9/2006 |
| JP | 2009-90845 | 4/2009 |
| JP | 2013-7138 | 1/2013 |
| WO | 2012/102345 | 8/2012 |

* cited by examiner

ACOUSTIC MATERIAL AND WIRE HARNESS WITH ACOUSTIC MATERIAL

BACKGROUND

1. Field of the Invention

The present invention relates to a sound-absorbing material using non-woven fabrics and a wiring harness with sound-absorbing material in which a sound-absorbing material and a wiring harness are integrated.

2. Description of the Related Art

In recent years, there has been a rapid growth in performance and function, centering on automotive vehicles, electronic products and the like. To accurately activate various pieces of electronic equipment such as automotive vehicles, electronic products and the like, a plurality of wires are used for internal wiring in the automotive vehicles, the electronic products and the like. Generally, the plurality of these wires are used in the form of a wiring harness. To obtain the wiring harness, a plurality of wires are assembled into a form necessary for wiring in advance. After necessary branching, connector mounting on ends and the like are applied, a wiring harness protection material which comes in various shapes such as a tape shape, a tube shape and a sheet shape is wound around the outer periphery of a wire bundle, thereby forming the wiring harness.

Further, sound-absorbing materials are provided in the interiors of automotive vehicles, houses and the like to enhance indoor silence. Conventionally, glass wool, rock wool, porous ceramics, waste cotton and the like have been used as sound-absorbing materials. However, due to problems such as workability, safety on human body, recyclability and environmental load, non-woven fabrics have been used as the above sound-absorbing materials in recent years (see, for example, Japanese Unexamined Patent Publication No. 2003-49351).

A sound-absorbing material described in patent literature 1 is such that a meltblown ultrafine staple fiber non-woven fabric is laminated on one side of a polyester-based fiber non-woven fabric. In the case of using such a laminated non-woven fabric as a sound-absorbing material, it is thought to be possible to enhance sound absorption performance in a specific frequency range, e.g. a frequency range of 1000 to 4000 Hz.

However, if it is tried to improve the sound absorption performance of the sound-absorbing material in a range other than the specific frequency range, e.g. a range below 1000 Hz, a basis weight of each non-woven fabric needs to be increased. However, if the basis weights of the non-woven fabrics are increased, it causes a problem of increasing a weight.

The present invention seeks to solve the above problem of the conventional technology and aims to provide a sound-absorbing material and a wiring harness with sound-absorbing material capable of absorbing sound in a wide frequency range from a low frequency to a high frequency and avoiding a weight increase.

SUMMARY

The prevent invention is directed to a sound-absorbing material in which a base material sheet using a non-woven fabric and a skin material sheet having a smaller basis weight than the base material sheet are laminated, characterized in that there are a plurality of the base material sheets and the skin material sheet is arranged between the plurality of base material sheets, and an air permeation amount of the sound-absorbing material is within a range of 5 to 50 cm3/cm2·s.

In the sound-absorbing material, the skin material sheet is preferably a non-woven fabric.

In the sound-absorbing material, the basis weight of the base material sheet is preferably within a range of 100 to 1000 g/m2.

In the sound-absorbing material, the basis weight of the skin material sheet is preferably within a range of 10 to 100 g/m2.

In sound-absorbing material, another skin material sheet different from the skin material sheet is preferably provided on an outermost surface.

The present invention is also directed to a wiring harness with sound-absorbing material, characterized in that the above sound-absorbing material and a wiring harness are integrated.

In the wiring harness with sound-absorbing material, the sound-absorbing material and the wiring harness are preferably integrated with the wiring harness sandwiched between the base material sheet and the skin material sheet of the sound-absorbing material.

The sound-absorbing material of the present invention is a sound-absorbing material in which the base material sheet using the non-woven fabric and the skin material sheet having the smaller basis weight than the base material sheet are laminated, wherein there are the plurality of base material sheets, the skin material sheet is arranged between the plurality of base material sheets and the air permeation amount of the sound-absorbing material is within the range of 5 to 50 cm3/cm2·s. This enables sound absorption in a wide frequency range from a low frequency to a high frequency and the avoidance of a weight increase, thereby being able to contribute to weight saving.

Further, the wiring harness with sound-absorbing material enables sound absorption in a wide frequency range from a low frequency to a high frequency and the avoidance of a weight increase, thereby being able to contribute to weight saving, by adopting a configuration in which the above sound-absorbing material and the wiring harness are integrated.

DETAILED DESCRIPTION

Figure 1:
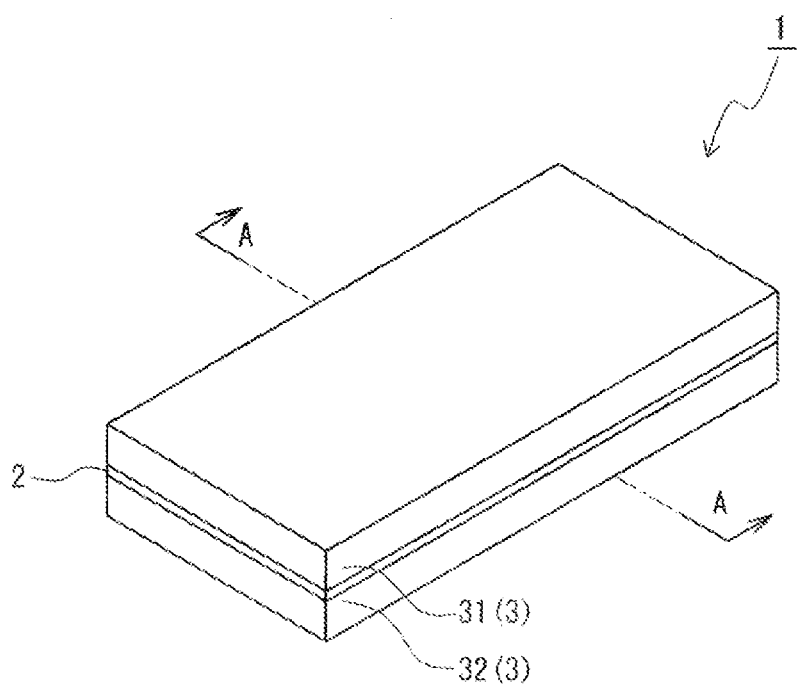
FIG. 1 is an external perspective view showing an example of a sound-absorbing material of the present invention.
Figure 2:
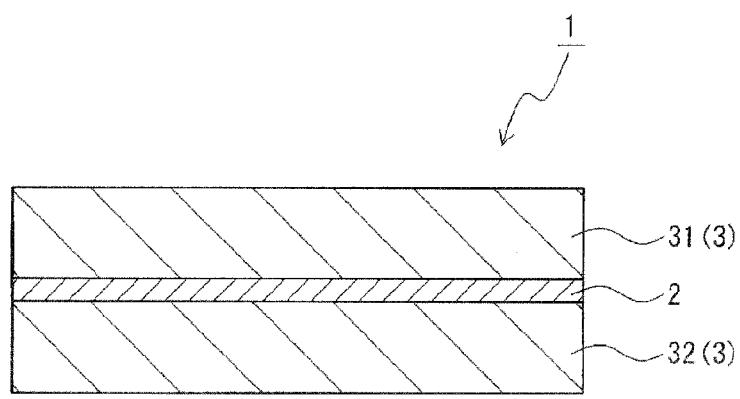
FIG. 2 is a vertical section along A-A of FIG. 1.

Hereinafter, an embodiment of the present invention is described in detail using the drawings. FIG. 1 is an external perspective view showing an example of a sound-absorbing material of the present invention, and FIG. 2 is a vertical section along A-A of FIG. 1. A sound-absorbing material 1 shown in FIGS. 1 and 2 is formed of a laminate sheet in which a plurality of sheets are laminated. The sound-absorbing material 1 is formed to have an air permeation amount of 5 to 50 cm3/cm2·s.

In the present invention, an air permeation amount of a sound-absorbing material or a skin material sheet is a value measured by an "air permeability test by fragile form method" of 8.26.1A of JIS L 1096 "Testing Methods for Woven and Knitted Fabrics". According to the air permeability test by fragile form method, a measurement can be made using a commercially available fragile form tester.

As shown in FIGS. 1 and 2, in the sound-absorbing material 1, a skin material sheet 2 is arranged between two base material sheets 3, i.e. a first base material sheet 31 and a second base material sheet 32. Nonwoven fabrics are used as the base material sheets 3, and the skin material sheet 2 has a smaller basis weight than the first and second base material sheets 31, 32. The first and second base material sheets 31, 32 are non-woven fabrics having the same configuration.

An air permeation amount of the skin material sheet 2 is within a range of 5 to 50 cm2/cm2·s. By arranging the skin material sheet 2 between the two base material sheets 3, 3 in this way, high sound absorption performance can be exhibited. Further, since the air permeation amount of the skin material sheet 2 is within the range of 5 to 50 cm2/cm2·s, high sound absorption performance can be obtained over a wide frequency range from a low frequency to a high frequency.

If the air permeation amount of the skin material sheet 2 is below 5 cm3/cm2·s, the sound absorption performance at high frequencies is reduced. Further, if the air permeation amount of the skin material sheet 2 exceeds 50 cm3/cm2·s, the sound absorption performance at low frequencies is reduced.

A non-woven fabric, a resin sheet, a film or the like can be used as the skin material sheet 2. A non-woven fabric is preferably used as the skin material sheet 2 since the sound absorption performance is good. The resin sheet, the film or the like may be made of one of thermoplastic resins such as olefin-based resins, polyester-based resins and polyvinyl chloride resins.

The air permeation amount of the sound-absorbing material 1 is preferably adjusted by changing the air permeation amount of the skin material sheet 2. In the case of using non-woven fabrics as the skin material sheet 2 and the base material sheets 3 of the sound-absorbing material 1, the air permeation amount can be adjusted by a fiber diameter, a basis weight, a thickness, a porosity (number of holes in the skin material) and the like of the skin material sheet 2. Generally, the air permeation amount increases as the basis weight decreases, and the air permeation amount decreases as the fiber diameter increases.

Further, the air permeation amount can also be adjusted by placing non-woven fabrics having different fiber diameters one over another. Further, the air permeation amount can be adjusted by a non-woven fabric fabrication method. For example, in the case of fabricating a non-woven fabric by needle punching, the air permeation amount can be adjusted by adjusting the number of times of punching when a non-woven fabric of the skin material sheet 2 and those of the base material sheets 3 are placed one over another to be integrated.

The basis weight of the skin material sheet 2 has only to be smaller than those of the base material sheets 3 and can be selected within such a range as to achieve the above air permeation amount.

The skin material sheet 2 preferably has a basis weight within a range of 10 to 100 g/m2. The skin material sheet 2 preferably has a thickness within a range of 0.1 to 3 mm.

In the case of using a non-woven fabric as the skin material sheet 2, a fiber diameter of fibers of the non-woven fabric is preferably within a range of 1 to 50 μm. If the fiber diameter decreases and the fibers become too thin, the sound absorption performance may be high, but the material may be brittle. Further, if the fiber diameter increases and the fibers become too thick, a sound absorption effect of the skin material sheet 2 may not be exhibited.

The shape of the fibers of the non-woven fabric of the skin material sheet 2 may be of a core-sheath type, a cylindrical type, a hollow type or a side-by-side type or fibers having a modified cross-section different in shape from normal fibers may be used. The fibers of the non-woven fabric may be either short fibers or long fibers.

Examples of the material of the fibers of the non-woven fabric of the skin material sheet 2 include polyesters such as polyethylene terephthalate and polybutylene terephthalate, polyolefin, nylon, polyamide, polyvinyl chloride, rayon, acryl, acrylonitrile, cellulose, kenaf and glass.

A non-woven fabric fabricated by needle punching, spun bonding, spun lacing, melt blowing or the like can be used as the non-woven fabric of the skin material sheet 2.

Nonwoven fabrics having a larger basis weight than the skin material sheet 2 are used as the non-woven fabrics of the base material sheets 3. Two non-woven fabrics, i.e. the first base material sheet 31 and the second base material sheet 31 are used as the base material sheets 3. The first and second base material sheets 31, 32 may be formed of non-woven fabrics having the same configuration or non-woven fabrics having different configurations may be used. If the basis weights of the first and second base material sheets 31, 32 differ, the non-woven fabric having a smaller basis weight has only to have a larger basis weight than the skin material sheet 2.

The non-woven fabric of the base material sheet 3 preferably has a basis weight within a range of 100 to 1000 g/m2 and a thickness within a range of 5 to 50 mm.

The fibers constituting the non-woven fabric of the base material sheet 3 preferably have a fiber diameter within a range of 4 to 100 μm.

The shape of the fibers of the non-woven fabric of the base material sheet 3 may be of a core-sheath type, a cylindrical type, a hollow type or a side-by-side type or fibers having a modified cross-section different in shape from normal fibers may be used. The above fibers may be either short fibers or long fibers.

The non-woven fabric of the base material sheet 3 preferably has the basis weight within the range of 100 to 1000 g/m2. A sound absorption coefficient in the entire frequency range of the sound-absorbing material 1 tends to become higher if the basis weight of the non-woven fabric of the base material sheet 3 increases and tends to become lower if the basis weight decreases.

Further, the non-woven fabric of the base material sheet 3 preferably has a thickness within a range of 5 to 40 mm. The sound absorption performance at low frequencies tends to become higher if the non-woven fabric of the base material sheet 3 becomes thick and the sound absorption performance at high frequencies tends to become higher if this non-woven fabric becomes thin. By changing the thickness of the non-woven fabric of the base material sheet 3, an absorption peak in the frequency range changes. The thickness of the non-woven fabric of the base material sheet 3 can be appropriately selected according to the frequency range where sound is absorbed.

Examples of the material of the fibers of the non-woven fabric of the base material sheet 3 include polyesters such as polyethylene terephthalate and polybutylene terephthalate, polyolefin, nylon, polyamide, polyvinyl chloride, rayon, acryl, acrylonitrile, cellulose, kenaf and glass.

A non-woven fabric fabricated by needle punching, spun bonding, spun lacing, melt blowing or the like can be used as the non-woven fabric of the base material sheet 3.

In the case of installing the sound-absorbing material 1 in a vehicle or the like, the skin material sheet 2 arranged closest to a sound source side is preferably configured to have a highest density. This is because sound incident on the sound-absorbing material 1 can be prevented from coming out again toward the sound source side through the skin material sheet 2 when being reflected inside.

A density of a non-woven fabric is an apparent density (bulk density) and can be obtained from the values of a basis weight and a thickness. The basis weight can be measured using a test method of JIS L1913 for obtaining a mass per unit area. Further, a thickness at the time of pressing at a pressure of 0.1 kPa can be used as the thickness.

The skin material sheet 2 and the base material sheets 3 are so formed that absorption and reflection characteristics of sound to be absorbed differ depending on the frequency range due to different basis weights. The sound-absorbing material 1 of the present invention can absorb sound in a wide frequency range by combining at least two base material sheets composed of the first and second base material sheets 31, 32 and one skin material sheet 2. Further, by arranging the skin material sheet 2 between the first and second base material sheets 31, 32, a high sound absorption effect is obtained in a high frequency range.

The respective skin material sheet 2 and base material sheets 3 constituting the sound-absorbing material 1 may be simply placed one over another or may be integrated by thermal fusion, adhesion or the like. The respective sheets of the sound-absorbing material 1 are preferably integrated by thermal welding, needle punching or the like.

Further, the respective sheets constituting the sound-absorbing material 1 may be held in close contact with each other or slight spaces may be provided therebetween.

Figure 3:
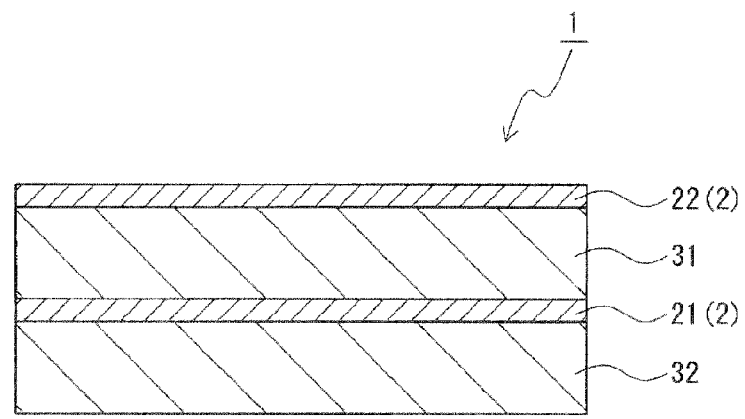
FIG. 3 is a section showing another mode of the sound-absorbing material of the present invention.

FIG. 3 is a section showing another example of the sound-absorbing material of the present invention. As shown in FIG. 3, the sound-absorbing material 1 may be formed to further include a second skin material sheet 22 on an outermost surface in addition to a first skin material sheet 21 arranged between the first and second base material sheets 31, 32. Although a sheet having the same configuration as the first skin material sheet 21 located at an intermediate position is used as the second skin material sheet 22 on the outermost surface in the sound-absorbing material 1 shown in FIG. 3, a sheet having a different configuration may be used. A non-woven fabric is preferably used as the second skin material sheet 22.

The second skin material sheet 22 on the outermost surface of the sound-absorbing material may be provided only on one outermost surface of the sound-absorbing material 1 as shown in FIG. 3, but may be provided on surfaces of the first base material sheet 31 on one outermost surface of the sound-absorbing material 1 and the second base material sheet 32 on the other surface so that the sound-absorbing material 1 includes the second skin material sheets 22 on both outer surfaces thereof.

The sound absorption effect at low frequencies can be further improved if the second skin material sheet 22 is provided also on the outermost surface of the sound-absorbing material 1 as shown in FIG. 3.

Figure 4:
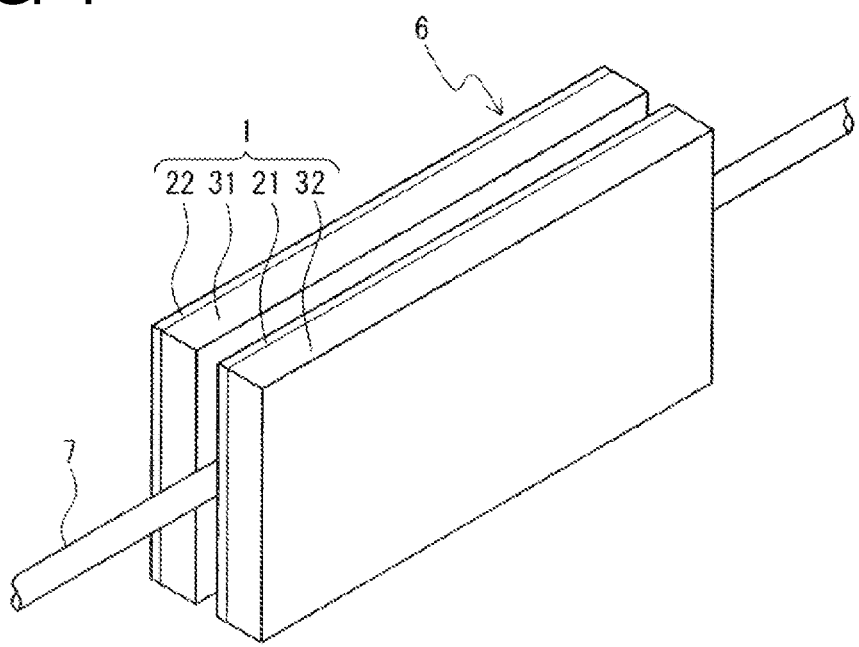
FIG. 4 is an external perspective view showing an example of a wiring harness with sound-absorbing material of the present invention.

FIG. 4 is an external perspective view showing an example of a wiring harness with sound-absorbing material of the present invention. As shown in FIG. 4, a wiring harness with sound-absorbing material 6 is a combination example of the sound-absorbing material 1 shown in FIG. 3 and a wiring harness 7. The wiring harness with sound-absorbing material 6 is an integrated assembly of the sound-absorbing material 1 and the wiring harness 7. The wiring harness 7 is integrated with a part thereof sandwiched between the first base material sheet 31 and the first skin material sheet 21 of the sound-absorbing material 1.

A fixed position of the wiring harness 7 in the wiring harness with sound-absorbing material 6 is not particularly limited to the above position. The wiring harness 7 may be arranged at any position of the sheets constituting the sound-absorbing material 1. For example, in the case of sandwiching the wiring harness 7 between the sheets so that the wiring harness 7 is located on an inner side of the sound-absorbing material 1 as shown in FIG. 4, a shock absorbing effect by the sheets is obtained.

The wiring harness 7 may be a wiring harness in which a wire bundle formed by bundling a plurality of wires, in each of which a core is covered around with an insulator, is covered around with a wiring harness protection material. The wiring harness 7 is not particularly limited to the above configuration and may be composed of only one wire or a plurality of wires may be bundled by a tying member or the like without using the wiring harness protection material.

A method for bonding the above wiring harness protection material or the like and the sound-absorbing material 1 via an adhesive is cited as a means for fixing and integrating the wiring harness 7 to and with the sound-absorbing material 1. Further, if the wiring harness 7 is sandwiched between the non-woven fabric of the first base material sheet 31 and the non-woven fabric of the first skin material sheet 21 as shown in FIG. 4, it is also possible to thermally weld the wiring harness protection material of the wiring harness and the non-woven fabrics. Further, although not particularly shown, the wiring harness 7 may be fixed to and integrated with the sound-absorbing material 1 using a separate mounting member or the like. The wiring harness 7 may be fixed to any one of the first skin material sheet 21, the second skin material sheet 22, the first base material sheet 31 and the second base material sheet 32.

Figure 5:
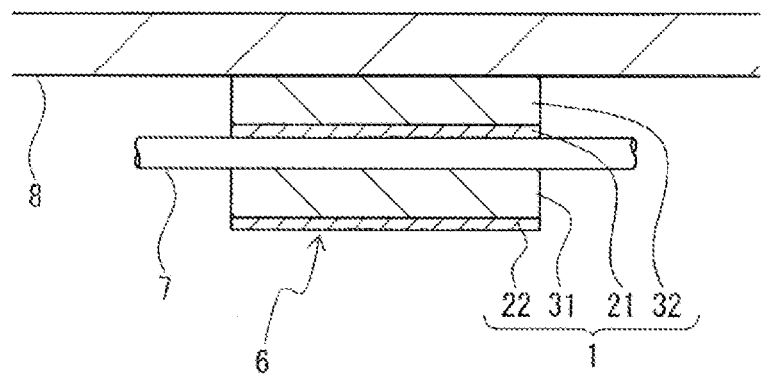
FIG. 5 is a section showing a state where the wiring harness with sound-absorbing material is mounted on a vehicle body.

FIG. 5 is a section showing a state where the wiring harness with sound-absorbing material 6 is mounted on a vehicle body. As shown in FIG. 5, the wiring harness with sound-absorbing material 6 is fixed in a state where one surface of the sound-absorbing material 1 is in contact with a vehicle body 8. An upward direction in FIG. 5 is a direction toward a sound source such as an engine compartment and a downward direction in FIG. 5 is a direction toward vehicle interior. To mount the sound-absorbing material 1 on the vehicle body 8, either the wiring harness 7 or the sound-absorbing material 1 or both the wiring harness 7 and the sound-absorbing material 1 can be fixed to a supporting member (not shown) installed on the vehicle body 8.

The sound-absorbing material 1 or the wiring harness with sound-absorbing material 6 can be installed at a position between an engine compartment and the vehicle interior of an automotive vehicle where it is desired to shut off noise such as in a dashboard of the automotive vehicle or the like.

The sound-absorbing material of the present invention can be suitably used as a sound-absorbing material for vehicle such as automotive vehicle. The wiring harness with sound-absorbing material of the present invention can be suitably used as a wiring harness for automotive vehicle.

EXAMPLES

Examples and Comparative Examples of the present invention are described below.

Example 1

After the second skin material sheet 22, the first base material sheet 31, the first skin material sheet 21 and the second base material sheet 32 were successively arranged and laminated in this order from the upper surface as shown in FIG. 3, the sheets were bonded and integrated at 180° to obtain a sound-absorbing material. An air permeation amount of the sound-absorbing material was 5 cm3/cm2·s. The air permeation amount was measured by the air permeability test method by fragile form method of JIS L 1096. Same non-woven fabrics were used as the skin material sheets 22, 21 and same non-woven fabrics were used as the base material sheets 31, 32. The following non-woven fabrics were used as those of the skin material sheets and those of the base material sheets.

[Non-Woven Fabric of Skin Material Sheet]

A non-woven fabric having a basis weight of 50 g/m2 and a thickness of 1 mm and fabricated by melt blowing was used. Long PP fibers having a fiber diameter of 5 to 10 μm were used as fibers of the non-woven fabric.

[Non-Woven Fabric of Base Material Sheet]

A non-woven fabric having a basis weight of 300 g/m2 and a thickness of 10 mm and fabricated by needle punching was used. Short polyester fibers having a fiber diameter of 14 μm and a fiber length of 51 mm were used as fibers of the non-woven fabric.

Examples 2 to 6

Comparative Examples 1 and 2

As shown in FIG. 3, the non-woven fabrics were successively arranged in the order of the second skin material sheet 22, the first base material sheet 31, the first skin material sheet 21 and the first base material sheet 32 from the upper surface similarly to a layer configuration of Example 1, thereby configuring a sound-absorbing material. As shown in Table 1, each sound-absorbing material was so configured that the air permeation amount of Example 2 was 10 cm3/cm2·s, that of Example 3 was 14 cm3/cm2·s, that of Example 4 was 27 cm3/cm2·s, that of Example 5 was 38 cm3/cm2·s, that of Example 6 was 50 cm3/cm2·s, that of Comparative Example 1 was 2 cm3/cm2·s and that of Comparative Example 2 was 58 cm3/cm2·s. The air permeation amount was adjusted by changing the fiber diameter, the basis weight, the thickness, the porosity, the fabrication method and the like of the non-woven fabrics used as the skin material sheets of Example 1. The sound-absorbing materials were fabricated with other factors set as in Example 1.

Example 7

As shown in FIG. 1, the non-woven fabrics of the skin material sheet and those of the base material sheet were successively arranged in the order of the base material sheet 31, the skin material sheet 2 and the base material sheet 32 from the upper surface, thereby configuring a sound-absorbing material of Example 7. The sound-absorbing material of Example 7 had an air permeation amount of 30 cm3/cm2·s. The same non-woven fabrics as those used in Example 1 were used as the non-woven fabric of the skin material sheet and those of the base material sheets of Example 7.

Comparative Example 3

Figure 6:
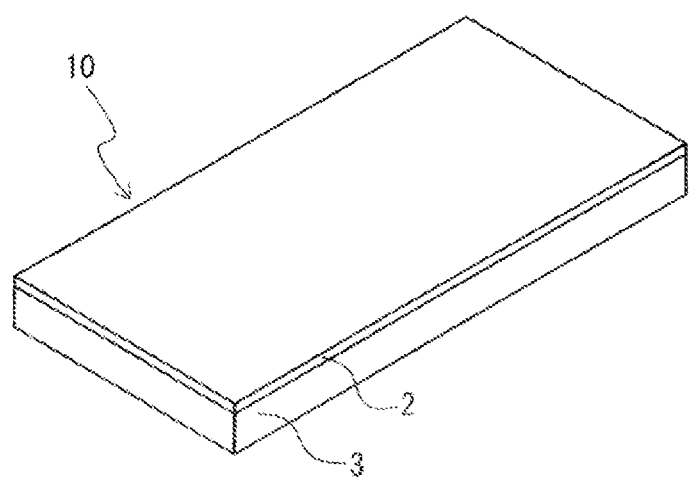
FIG. 6 is an external perspective view showing a sound-absorbing material of Comparative Example 3.

As shown in FIG. 6, the non-woven fabric of the skin material sheet 2 and that of the base material sheet 3 were arranged to configure a sound-absorbing material of Comparative Example 3. The sound-absorbing material of Comparative Example 3 had an air permeation amount of 36 cm3/cm2·s. The same non-woven fabrics as those used in Example 1 were used as the non-woven fabric of the skin material sheet and that of the base material sheet of Comparative Example 7.

A reverberant sound absorption coefficient was measured and sound absorption performance was evaluated for the sound-absorbing material of each of Examples 1 to 7 and Comparative Examples 1 to 3. A measurement result on the sound absorption coefficient is shown in Tables 1 and 2. The details of the configurations of the sound-absorbing materials of Examples and Comparative Examples and a reverberant sound absorption coefficient test method are as follows.

[Reverberant Sound Absorption Coefficient Measurement Method]

Figure 7:
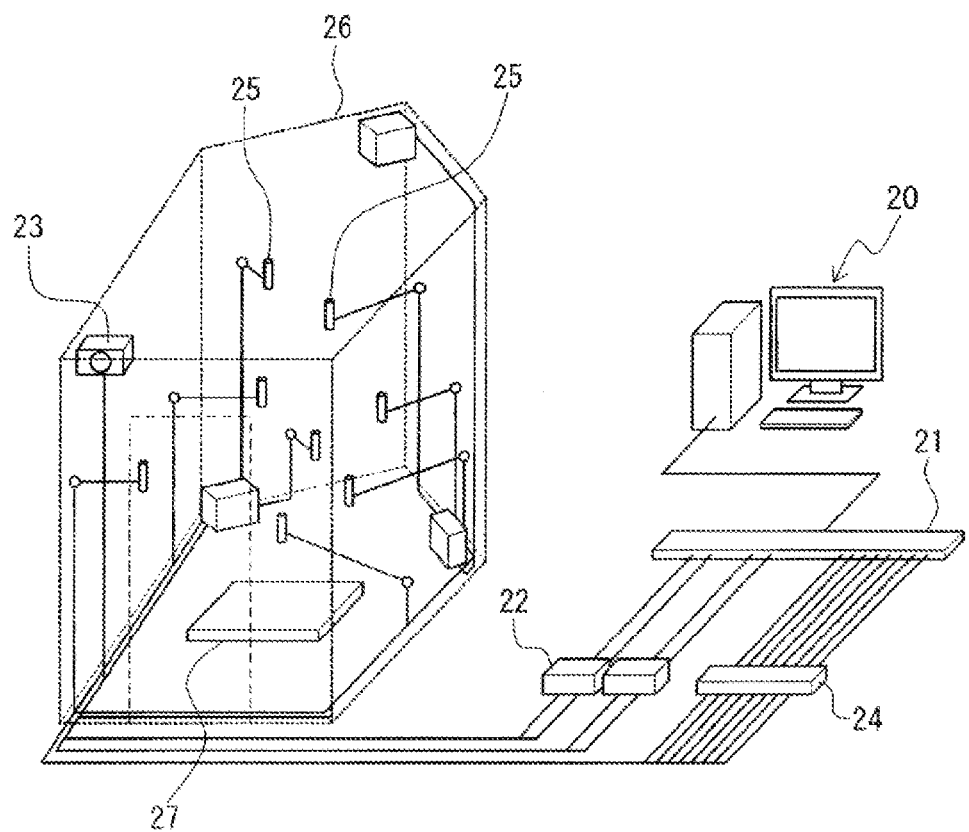
FIG. 7 is a diagram showing a reverberant sound absorption coefficient measurement method.

The sound absorption coefficient was measured in accordance with a reverberant sound absorption coefficient measurement method of JIS A 1409 and obtained by a calculation expression shown in the following equation (1). The larger the value of the sound absorption coefficient, the better the sound absorption. As shown in FIG. 7, a reverberant chamber 26 in which a speaker 23 connected to a personal computer 20 via a power amplifier 22 and an audio interface 21 and a microphone 25 connected to the personal computer 20 via a microphone amplifier 24 and the audio interface 21 were arranged at predetermined positions was used for the test. First, electrical noise sound was emitted from the speaker 23 in a state where a sample (sound-absorbing material) was not arranged in the reverberation chamber 26, the sound was stopped and a sound attenuation process was measured by the microphone 25. Subsequently, a time during which the sound was attenuated in a range of −5 to −35 dB was obtained as a reverberation time T1 from a measured attenuation curve. The measurement was conducted for each ⅓ octave band having a center frequency of 400 Hz to 10000 Hz. Subsequently, a sample 27 was arranged on a floor surface of the reverberation chamber 26 and a reverberation time $T_2$ was obtained in a manner similar to the above. A sound absorption coefficient ($\alpha_s$) was calculated by the following equation (1).

$$\alpha_s(\text{sound absorption coefficient}) = A/S \quad (1)$$

S: Area of the sample (m²)

A: Equivalent sound absorption area (m²), obtained by the following equation (2)

$$A = 55.3 V/c \cdot [1/T_2 - 1/T_1] \quad (2)$$

V: Volume of the reverberation chamber in the state where no sample is set (m³)

c: sound velocity in air (m/s)

$T_1$: Reverberation time (s) of the reverberation chamber in the state where no sample is set $T_2$: Reverberation time (s) of the reverberation chamber in the state where the sample is set

TABLE 1

|  | Ex. 1 | Ex. 2 | Ex. 3 | Ex. 4 | Ex. 5 | Ex. 6 | C. Ex. 1 | C. Ex. 2 |
|---|---|---|---|---|---|---|---|---|
| Air Permeation Amount (cm³/cm² · s) | 5 | 10 | 14 | 27 | 38 | 50 | 2 | 58 |
| Frequency (Hz) | Reverberation Sound Absorption Coefficient | | | | | | | |
| 400 | 0.37 | 0.49 | 0.43 | 0.47 | 0.34 | 0.31 | 0.45 | 0.28 |
| 500 | 0.44 | 0.50 | 0.49 | 0.53 | 0.50 | 0.48 | 0.47 | 0.30 |
| 630 | 0.61 | 0.64 | 0.66 | 0.66 | 0.64 | 0.64 | 0.56 | 0.41 |
| 800 | 0.84 | 0.74 | 0.87 | 0.88 | 0.82 | 0.72 | 0.59 | 0.47 |
| 1000 | 1.05 | 0.82 | 1.00 | 0.98 | 0.97 | 0.80 | 0.69 | 0.57 |
| 1250 | 1.13 | 0.97 | 1.07 | 1.04 | 1.03 | 0.97 | 0.85 | 0.72 |
| 1600 | 1.16 | 1.06 | 1.14 | 1.08 | 1.10 | 1.03 | 0.98 | 0.85 |
| 2000 | 1.12 | 1.13 | 1.16 | 1.12 | 1.13 | 1.08 | 1.11 | 0.96 |
| 2500 | 1.05 | 1.15 | 1.16 | 1.11 | 1.12 | 1.08 | 1.12 | 0.99 |
| 3150 | 0.98 | 1.11 | 1.10 | 1.05 | 1.07 | 1.08 | 0.99 | 1.03 |
| 4000 | 0.96 | 1.08 | 1.06 | 1.04 | 1.04 | 1.12 | 0.90 | 0.99 |
| 5000 | 0.97 | 1.07 | 1.05 | 1.04 | 1.00 | 1.13 | 0.90 | 0.99 |
| 6300 | 0.98 | 1.08 | 1.07 | 1.03 | 0.95 | 1.08 | 0.85 | 1.01 |
| 8000 | 0.94 | 1.10 | 1.03 | 1.05 | 0.95 | 1.13 | 0.70 | 1.08 |
| 10000 | 0.90 | 1.08 | 1.02 | 1.04 | 1.03 | 1.05 | 0.56 | 1.09 |

TABLE 2

|  | Ex. 7 | C. Ex. 3 |
|---|---|---|
| Air Permeation Amount (cm³/cm² · s) | 30 | 36 |
| Frequency (Hz) | Reverberation Sound Absorption Coefficient | |
| 400 | 0.41 | 0.18 |
| 500 | 0.48 | 0.20 |
| 630 | 0.60 | 0.28 |
| 800 | 0.78 | 0.35 |
| 1000 | 0.96 | 0.48 |
| 1250 | 1.08 | 0.59 |
| 1600 | 1.17 | 0.72 |
| 2000 | 1.19 | 0.89 |
| 2500 | 1.15 | 1.01 |
| 3150 | 1.09 | 1.05 |
| 4000 | 1.06 | 1.10 |
| 5000 | 1.04 | 1.10 |
| 6300 | 1.07 | 1.07 |
| 8000 | 1.05 | 1.03 |
| 10000 | 1.01 | 0.92 |

[Concerning Sound Absorption Coefficient Measurement Result]

Figure 8:
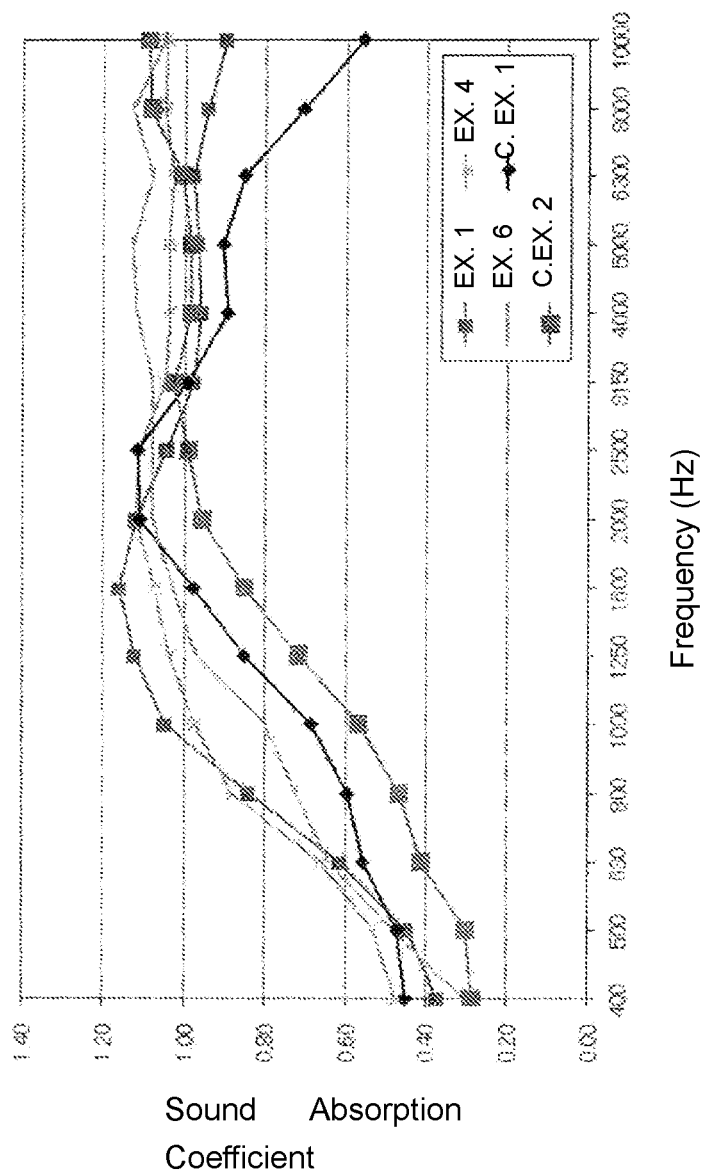
FIG. 8 is a graph showing relationships of sound absorption coefficients and frequencies of Examples 1, 4 and 6 and Comparative Examples 1 and 2.

FIG. 8 is a graph showing relationships of the sound absorption coefficients and the frequencies of the sound-absorbing materials of Examples 1, 4 and 6 and Comparative Examples 1 and 2. As shown in FIG. 8, all of Examples 1, 4 and 6 having an air permeation amount within a range of 5 to 50 cm³/cm²·s had good sound absorption performance at frequencies not lower than 630 Hz. Contrary to this, Comparative Example 1 having an air permeation amount below 5 cm³/cm²·s had low sound absorption performance at high frequencies and Comparative Example 2 having an air permeation amount exceeding 50 cm³/cm²·s had low sound absorption performance at low frequencies.

Figure 9:
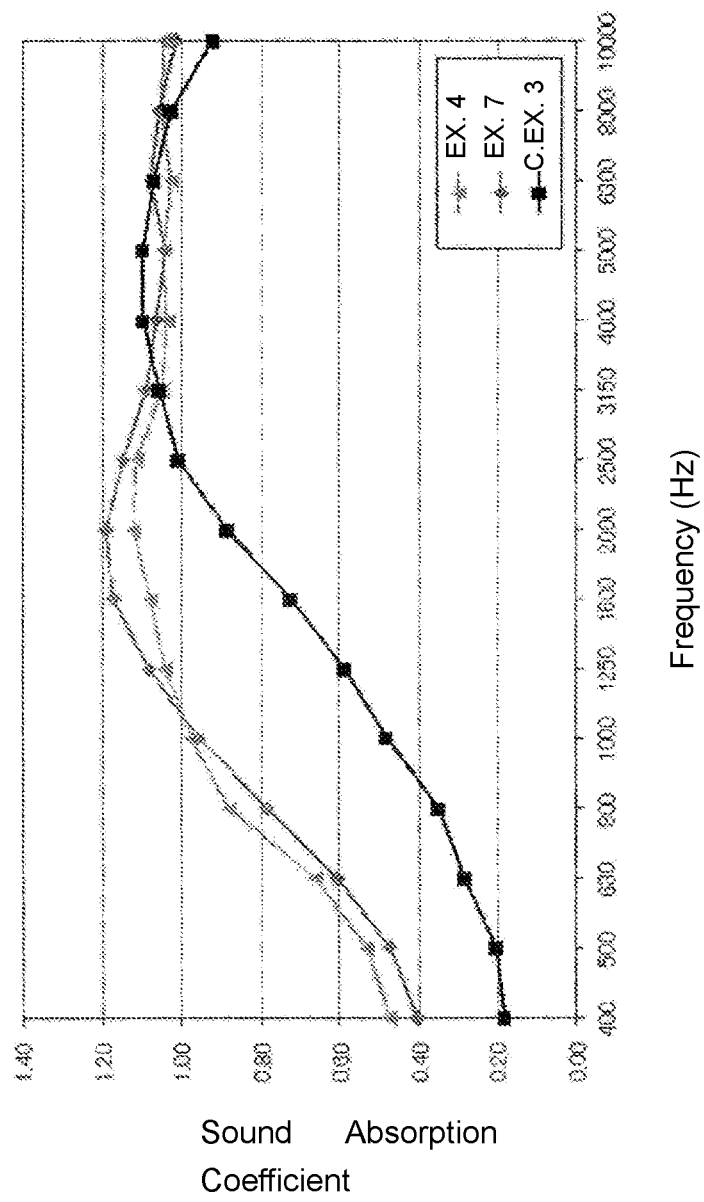
FIG. 9 is a graph showing relationships of sound absorption coefficients and frequencies of Examples 4 and 7 and Comparative Example 3.

FIG. 9 is a graph showing relationships of the sound absorption coefficients and the frequencies of the sound-absorbing materials of Examples 4 and 7 and Comparative Example 3. As shown in FIG. 9, the sound-absorbing material of Comparative Example 3 composed only of the skin material sheet and the base material sheet had significantly lower sound absorption performance at frequencies lower than 3150 Hz as compared with Examples 4 and 7. Further, the sound-absorbing material of Example 4 had good sound absorption performance at frequencies lower than 1000 Hz as compared with the sound-absorbing material of Example 7.

In the case of forming a sound-absorbing material of a single-layer non-woven fabric or the like, a basis weight needs to be increased to improve the sound absorption performance. Contrary to this, by arranging a skin material sheet having an appropriate air permeation amount between base material sheets and setting an air permeation amount of a sound-absorbing material within a range of 5 to 50 cm3/cm2·s, high sound absorption performance can be obtained in a wide range from a low frequency to a high frequency. Further, the sound absorption performance can be improved without increasing the basis weight unlike the sound-absorbing material formed of the single-layer non-woven fabric. Since it is not necessary to increase the basis weight more than necessary, a weight increase of the sound-absorbing material can be avoided.

Although the examples of the present invention have been described in detail above, the present invention is not limited to the above examples at all and various changes can be made without departing from the gist of the present invention.

The sound-absorbing material of the present invention may be composed of three or more base material sheets or may be composed of three or more skin material sheets.

The invention claimed is:

1. A wiring harness assembly, comprising: a wiring harness sandwiched between and integrated with at least two sheets of a sound-absorbing material, each of the sheets of the sound-absorbing material having a base material sheet using a non-woven fabric and a skin material sheet laminated to the respective base material sheet, the skin material sheet being a non-woven fabric having a smaller basis weight than the base material sheets, wherein: at least one of the skin material sheets is arranged between a plurality of the base material sheets; and an air permeation amount of the sound-absorbing material is within a range of 5 to 50 $cm^3/cm^2 \cdot s$.

2. The wiring harness assembly of 1, wherein the basis weight of the base material sheet is within a range of 100 to 1000 $g/m^2$.

3. The wiring harness assembly of claim 2, wherein the basis weight of the skin material sheet is within a range of 10 to 100 $g/m^2$.

4. The wiring harness assembly of claim 3, wherein another skin material sheet different from the skin material sheet is provided on an outermost surface.

5. The wiring harness assembly of claim 1, wherein the basis weight of the skin material sheet is within a range of 10 to 100 $g/m^2$.

6. The wiring harness assembly of claim 1, wherein another skin material sheet different from the skin material sheet is provided on an outermost surface.

\* \* \* \* \*